Patented Sept. 29, 1953

2,653,902

UNITED STATES PATENT OFFICE 2,653,902

DEODORANT, ANTIPERSPIRANT COMPOSITIONS

Francis M. Thurmon, Boston, Mass., assignor to Rohm & Haas Company, Philadelphia, Pa., a corporation of Delaware No Drawing. Application September 28, 1950, Serial No. 187,359

9 Claims. (Cl. 167—90)

This invention concerns compositions for retarding or inhibiting the flow of perspiration and for preventing or inhibiting odors from perspiration.

Aluminum salts of strong inorganic acids have been used to inhibit the flow of perspiration by application of solutions thereof to axillary sweat pores and to other body areas. Such solutions frequently cause irritation, in some cases producing dermatitis, and attack cellulosic fabrics due apparently to liberation of strong acid from the salts. Thus, a logical step was the proposed use of aluminum salts of weaker acids. These, however, have proved much less effective in inhibiting perspiration and they do not prevent odors as well as the salts of strong acids do.

It is an object of this invention to provide compositions which will inhibit the flow of perspiration and the development of odors from perspiration in an acceptable manner and yet be free of the objections to previously proposed compositions.

I have found that effective antiperspirant and deodorant compositions are prepared by incorporating in a hydrophilic base a water-soluble aluminum salt of an organic acid and a cation exchange resin having carboxy groups as the functional portion thereof.

As an aluminum salt there may be used a water-soluble aluminum salt of such acids as acetic, propionic, citric, tartaric, and the like or a sulfonated acid, such as methionic acid or phenol-sulfonic acid.

As a cation exchange resin there is used one characterized by the presence of the —COOH group. Such resins are insoluble materials and yet they can supply hydrogen ions and take up other cations. The resins are prepared from carboxylic acids having an unsaturated linkage which permits these acids (or their anhydrides) to form copolymers or heteropolymers with polymerizable substances, including substances which cause cross-linking. For example, maleic anhydride and styrene can be polymerized together, and when there is also present an unsaturated compound having at least two non-conjugated double bonds, an insoluble resin results. The cross-linking agent may be a polyunsaturated compound such as divinylbenzene, trivinylbenzene, ethylene diacrylate, diallyl maleate or fumarate or itaconate, or the like. Another carboxylic ion exchange resin can be prepared by the copolymerization of acrylic or methacrylic acid and a polyunsaturated substance, such as one of the above. Copolymers or heteropolymers are formed in a conventional way with the aid of a catalyst, such as a peroxide, of which benzoyl peroxide, lauroyl peroxide, tert.-butyl perbenzoate, or tert.-butylhydroperoxide are typical examples. The solid resin may be crushed to a fine powder. Usually the resin is used in a particle size finer than 100 mesh and it is desirable that the bulk of the resin pass a 250 mesh screen. Insoluble carboxylic resins may also be formed by emulsion polymerization and precipitated as fine particles. Acid anhydride groups are converted to carboxy groups by treatment of resins with an alkali or strong acid. The salt form of a resin is readily converted to the acid form having carboxy groups by washing of resin with acid. Presence of some of the functional groups of the resin in salt form is permissible. For example, some of the acidic groups of the resin may be used to take up a drug having a basic group or a cation which possesses therapeutic value.

The hydrophilic base in which the aluminum salt is dissolved and the carboxylic exchanger dispersed may be an aqueous cream, an aqueous paste, or an ointment base in which the external phase is water. The preparation may thus vary considerably in consistency and be applied by "patting on" if a liquid or by smearing if a paste or ointment.

In an ointment base there may be used stearic acid, spermaceti, cetyl alcohol, lanolin, waxes, oils, or the like dispersed as the internal phase in an aqueous medium. As dispersing or emulsifying agent, there may be used an ethanolamine soap, glyceryl monolaurate, glycol monolaurate, glyceryl monostearate, a polyglycerol-oleic acid condensate, a polyethoxyethanol, or other emulsifying agent useful in preparing an oil-in-water base.

Solutions of inert thickening agents, such as cellulose ethers, polyethylene glycols, gums, and the like may be used in the preparation of lotions or pastes, or in conjunction with ointment bases. The aqueous base may also contain compounds such as glycerine, ethoxyethoxythanol, sorbitol, and the like which serve as humectants and softeners, and may also contain preservatives and perfumes, if desired.

A typical base may be prepared from 250 parts of cetyl alcohol, 250 parts of a white petroleum wax, 120 parts of propylene glycol, 10 parts of sodium dodecyl sulfate, 0.25 part of methyl parahydroxybenzoate, 0.25 part of propyl parahydroxybenzoate, and 370 parts of water. Perfuming material may be added, if desired.

This base can be mixed with a solution of an aluminum salt and with a carboxylic exchanger. For example, 45 parts of aluminum phenolsulfonate is taken up in 30 parts of alcohol and mixed with 180 parts of the above base and 75 parts of a finely divided cation exchange resin made from methacrylic acid and cross-linked with divinylbenzene.

This composition, applied to axillary surfaces, is effective in preventing odor and perspiration. Applied at first at two-day intervals and then at four to five-day intervals in a number of test cases, it remains effective without causing irritation and without damaging clothing. In comparisons made with standard formulations based on aluminum chloride, the above composition is superior in every respect. A similar preparation containing aluminum phenolsulfonate without the carboxylic exchanger is not fully effective as an antiperspirant or as a deodorant. An ointment with the above proportion of resin but without the aluminum phenolsulfonate controls odor but does not inhibit perspiration.

Another composition is prepared with 30 parts of aluminum phenolsulfonate, 75 parts of a cation exchange resin prepared in emulsion from acrylic acid and divinylbenzene and then precipitated, and 195 parts of the above base tinted with a pink dye and lightly perfumed. This composition is found effective as an antiperspirant and deodorant. No irritation is observed even after prolonged use.

Strips of cotton cloth rubbed with the above composition and stored for two weeks suffer no significant loss in tensile strength.

A base is made by heating 20 parts of glyceryl monostearate, 5 parts of glycerin, 4 parts of spermaceti, 1 part of methyl cellulose, and 70 parts of water. A solution of 20 parts of aluminum phenolsulfonate in a minimum amount of alcohol is mixed therewith and 30 parts of a carboxylic cation exchange resin made from methacrylic acid and divinylbenzene added and thoroughly incorporated by stirring. The resulting ointment is effective as an antiperspirant and deodorant. It does not cause irritation of skin to which applied and it does not noticeably attack cellulosic fabrics.

A mixture is made with 20 parts of calamine, 10 parts of zinc oxide, 60 parts of a finely divided cation exchange resin from maleic anhydride, styrene, and divinylbenzene, 10 parts of glycerin, 200 parts of a 5% bentonite paste, 100 parts of water, and 50 parts of a water-dispersible ointment base. Thereto is added a mixture of 100 parts of water and 50 parts of basic aluminum acetate, containing a small amount of oil of thyme, oil of lavender flowers, and oil of peppermint. This is a very mild antiperspirant and deodorant which can be used on even very delicate skins. It is an effective astringent and deodorant.

A deodorant is made from 16 parts of aluminum phenolsulfonate taken up in 40 parts of perfumed spirits N. F., 20 parts of finely powdered carboxylic resin made from methacrylic acid and divinylbenzene, 0.25% of oil of lavender, 0.5% of ethyl acetate, and distilled water to make 100%. The composition is shaken well and applied to the skin as a "pat on" lotion. It effectively decreases the flow of perspiration and acts as a deodorant.

In place of the above aluminum salts there may be used in the compositions such compounds as aluminum acetotartrate or aluminum citrate. Even though the compositions in which these aluminum salts are the sole reactive ingredient are not particularly effective, the addition thereto of a cation exchanger in its carboxy form gives a marked increase in both antiperspirant and deodorant properties.

The carboxylic exchange resin should be present in the composition at about 8% to 35% of the total. The aluminum salt of an organic acid should constitute 5% to 25% of the composition. Preferred compositions contain 15% to 25% of the carboxylic exchanger and 10% to 20% of the aluminum salt.

There is a definite coaction between the aluminum salt and cation exchange resin in its hydrogen form. The aluminum ions in the vicinity of the resin particles act as free aluminum ions and yet without the irritating effects of soluble aluminum salts of strong acids. The carboxylic resins supply hydrogen ions within the sphere of influence of each particle and thus provide some of the action of the strong acids, yet without their undesirable effects.

The basic formula of carboxylic exchanger, soluble aluminum salt of an organic acid, and hydrophilic base may be further modified by incorporating therein medicaments such as zinc peroxide, hexamethylene tetramine, formaldehyde, oxyquinoline sulfate, chlorothymol, a surface anesthetic, such as butacaine, or procaine, or the like.

The compositions formulated from a carboxylic acid exchange resin, an aluminum salt of an organic acid, and a hydrophilic base are unusually effective for their intended purposes. They are stable, non-greasy, non-irritating, non-dehydrating, non-hygroscopic, removable with water, compatible with medication which may be incorporated, free from objectionable odors, non-staining, and non-corrosive. These compositions are effective in preventing "dress" dermatitis, caused by contact with some textile dyes and can be used safely over a considerable period of time.

The combination of aluminum salt and carboxylic acid exchanger appears to be peculiarly effective, not only because of formation of insoluble aluminum compounds and desquamation of skin with resultant decrease in exudation of sweat but also because of absorption of various components of sweat thus effectively removing materials which through decomposition or putrefactive action of organisms can lead to irritating or malodorous products. For example, there have been found in normal sweat 100 to 160 micrograms per cubic centimeter of arginine, 70 to 90 micrograms per cubic centimeter of histidine, and amounts between 10 and 60 micrograms per cubic centimeter of such aminoacids as isoleucine, leucine, lysine, phenylalanine, threonine, tryptophane, tyrosine, and valine. Such compounds are adsorbed by the compositions of this invention in consequential proportions, particularly those which have high nitrogen contents. There can thus be removed in large measure such compounds as arginine and histidine, the latter of which yields irritating histamine. It is thus reasonable to believe that the compositions of this invention are effective by removing materials from which substances with unpleasant properties can be formed. It also seems probable that the compositions are peculiarly effective by controlling the acidity of the body surfaces where they are applied with benefit of results which would flow from control of pH.

I claim:
1. As a new composition of matter, an antiperspirant and deodorant preparation comprising a cation exchange resin having the carboxy radical as the functional group thereof and a water-soluble aluminum salt of an organic acid, dispersed in a hydrophilic base which contains water at least in the external phase.

2. As a new composition of matter, an antiperspirant and deodorant preparation comprising 8% to 35% of a cation exchange resin having the carboxy radical as the functional group thereof and 5% to 25% of a water-soluble aluminum salt of an organic acid, dispersed in a hydrophilic base which contains water at least in the external phase.

3. As a new composition of matter, an antiperspirant and deodorant preparation comprising aluminum phenolsulfonate, a cation exchange resin having the carboxy radical as the functional group, and a hydrophilic base which contains water at least in the external phase.

4. As a new composition of matter, an antiperspirant and deodorant preparation comprising aluminum phenolsulfonate and a cation exchange resin dispersed in a hydrophilic ointment base which is an oil-in-water emulsion.

5. As a new composition of matter, an antiperspirant and deodorant preparation comprising 15% to 25% of a cation exchange resin having the carboxy radical as the functional group thereof and 10% to 20% of a water-soluble aluminum salt of an organic acid, dispersed in a hydrophilic, oil-in-water ointment base.

6. A composition of claim 5 in which the aluminum salt is aluminum phenolsulfonate.

7. A composition of matter comprising 15% to 25% of a cation exchange resin having the carboxy radical as the functional group thereof and 10% to 20% of water-soluble aluminum salt of an organic acid dispersed in an ointment base comprising 250 parts of cetyl alcohol, 250 parts of white petroleum wax, 120 parts of propylene glycol, 10 parts of an oil-in-water emulsifying agent, and about 370 parts of water.

8. The composition of claim 7 in which the aluminum salt is aluminum phenolsulfonate.

9. The composition of claim 7 in which the resin is a copolymer of methacrylic acid and divinylbenzene.

FRANCIS M. THURMON.

References Cited in the file of this patent

UNITED STATES PATENTS

| Number | Name | Date |
|---|---|---|
| 2,368,075 | Wampner | Jan. 23, 1945 |
| 2,492,085 | Anderson | Dec. 20, 1949 |
| 2,501,927 | Block | Mar. 28, 1950 |

FOREIGN PATENTS

| Number | Country | Date |
|---|---|---|
| 67,658 | Norway | Apr. 3, 1944 |

OTHER REFERENCES

De Navarre, Chemistry and Manufacture of Cosmetics (1941), pages 324 to 325.

Goodman, Cosmetic Dermatology (1936), page 36.

Merck Index, 4th edition (1930), page 545.